F. H. STANWOOD.
NON-SLIPPING TREAD.
APPLICATION FILED NOV. 3, 1914.
1,185,444.
Patented May 30, 1916.
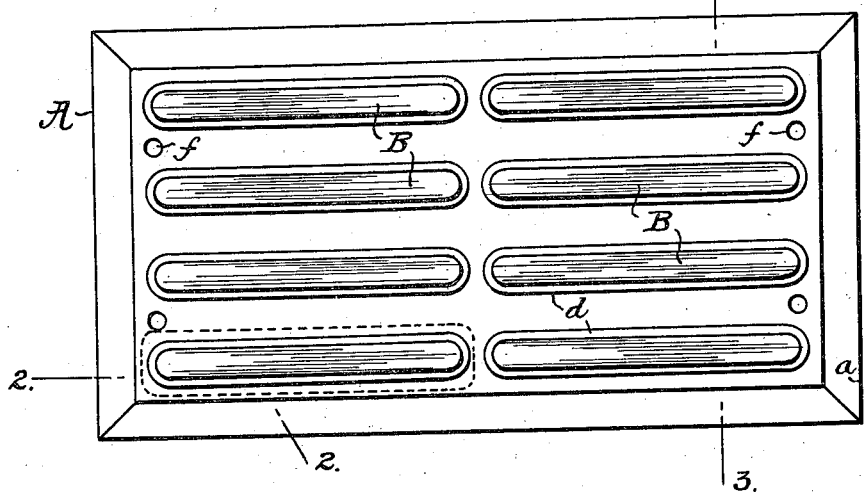
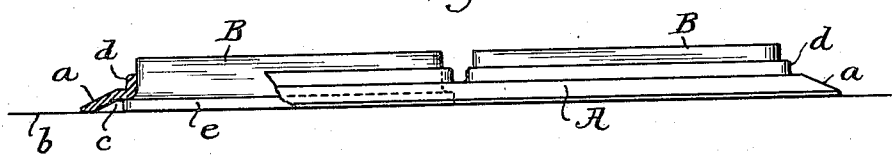
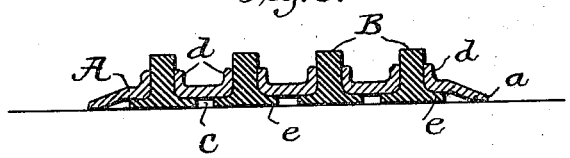
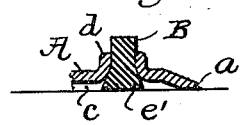
Inventor
Frank H. Stanwood
Witnesses:
Rena E. Fish
F. L. Dalton

UNITED STATES PATENT OFFICE.

FRANK H. STANWOOD, OF ARLINGTON, MASSACHUSETTS, ASSIGNOR TO STANWOOD EQUIPMENT COMPANY, A CORPORATION OF MAINE.

NON-SLIPPING TREAD.

1,185,444.  Specification of Letters Patent.  Patented May 30, 1916.

Application filed November 3, 1914. Serial No. 870,152.

*To all whom it may concern:*

Be it known that I, FRANK H. STANWOOD, a citizen of the United States, residing at Arlington, Middlesex county, and State of Massachusetts, have invented a new and useful Improvement in Non-Slipping Treads, of which the following is a specification.

This invention relates in general to non-slipping treads adapted for use in tread or walking surfaces such as stairs, steps, walks, runways, step treads and the like, the particular use of the invention however being in connection with automobile running-boards and other vehicles, although it will be manifest as the invention is better understood that it has a much wider and broader application.

Prior to my invention it has generally been the custom in automobiles to provide upon the running-board a cocoa or other mat which unless the running-board be cut away for its reception, extends thereabove a substantial distance, where it is unsightly. This form of non-slipping and foot cleaning device is the source of considerable annoyance and inconvenience by reason of the fact that it is difficult to remove dirt, dust and other matter collected thereby, and by reason also of the fact that a person entering a car provided with such a mat is required to step higher than the running-board, at considerable danger of tripping over the mat in entering the car.

A principal object of this invention is the provision of a non-slip tread unit, the parts of which will be so constructed and arranged that the unit need not extend above the normal surface of the running-board an appreciable distance and which will last without the necessity of replacement from wear throughout the life of the ordinary high priced automobile.

Another and very important object of the invention is the provision of a device of the character described which will effectively remove mud and other foreign matter from the feet of persons entering the car, the parts of the device being so constructed and arranged that the matter thus removed may readily in turn be removed from the device.

It is a further object of my present invention to provide a non-slip, tread surface forming unit, the parts of which can be readily assembled and shipped in assembled condition to automobile manufacturers, dealers, and, if desired, automobile owners, ready to be installed in place upon the running-board of the automobile with minimum effort and with little or no chance of improper positioning.

An additional object of the invention is the provision of such a device consisting of a minimum number of simple and economically constructed parts requiring no special fitting or shaping in the assembling of the structure, thereby permitting such parts to be separately manufactured of standard dimensions and readily fitted together without special expensive equipment, and by unskilled and cheap labor.

A further object of the invention is the provision of a tread unit possessing the advantages already mentioned, which may be employed with other similar units if desired to surface the complete running-board and which in case of accident resulting only to a part of the running-board results in little or no effect on the sections or units not immediately located at the damaged part, these units being so constructed and positioned that they may be readily removed undamaged and subsequently secured upon a new running-board or upon a running-board replacing the one damaged.

A further object of the invention is to provide such a device with anti-friction and cleaning elements so constructed and arranged in the unit that damage sustained by the non-slipping portion of the unit may be repaired at low cost and through the replacement of a minimum amount of anti-slipping and cleaning material.

Another object of the invention is the provision of a non-slipping tread which, while consisting of parts removable for repair and replacement, will be so constructed as to prevent any leakage of water, dust and other matter through the unit.

Other objects and advantages of the invention will be apparent as it is better understood from the following description when considered in connection with the accompanying drawing illustrating a preferred embodiment thereof.

The accompanying drawings, forming a part hereof, show in Figure 1, a plan view of the improved tread in its preferred form; Fig. 2, a longitudinal side elevation, partly in section, taken on the line 2, 2 of Fig. 1; Fig. 3, a cross section on the line 3, 3 of Fig. 1; Fig. 4, an elevation of the removable tread-pad separated from its supporting or carrying plate; and Fig. 5, a cross section of a modified form of the tread-pad with a portion of its supporting plate adapted thereto.

In said figures: A, is the supporting or carrying plate and B, the tread-pads. The plate A, is preferably formed of comparatively thin sheet metal such as steel, embossed, stamped or otherwise formed to provide a downwardly extending bearing ledge or rim $a$, on all its sides for direct contact with the tread-supporting surface $b$, thus leaving an interior inclosure or recess $c$, to be occupied by the foot portions of the tread-pads B, as hereinafter explained. The plate A, is perforated with suitably shaped holes each bounded by a surrounding upwardly extending continuous unbroken lip or wall $d$, forming comparatively high sides or walls to the holes, greater in extent than the thickness of the plate, when of sheet metal, would otherwise provide, to present a sidewise support, stay or brace to the body of the tread-pads, impart rigidity thereto and prevent undue flexing.

Each of the tread-pads B, has a body or rib shaped to conform to the shape of the holes or perforations in the plate A, and is of sufficient height to extend and project above the upper edges of the raised sides or walls $d$ of the holes in the plate, to form, when a number are assembled, a level or even exposed tread surface. The lower portion of each tread-pad is widened or extended laterally to provide an enlarged foot $e$, which, when the pad is assembled with the plate is seated in the recess provided on its underside so that its bottom surface is substantially level with the surrounding rim $a$, to bear with the rim upon the tread-supporting surface $b$. The foot of the tread-pad thus underlying the plate imparts greater rigidity thereto and prevents its cracking or undue bending.

The shape of the holes or perforations in the supporting plate may be varied, but as shown, they are preferably long and narrow with rounded ends and aranged in parallel rows; the body of the tread-pad being correspondingly shaped to snugly fit the holes and yet be readily inserted and removed from the underside. The widened foot portions $e$, of the tread-pads, obviously prevent their removal from the upper side and therefore there is no danger of their loss except by the bodily removal of the plate from the tread supporting surface, whatever it may be. The plate will be provided with suitably disposed screw or bolt holes $f$, for securing it in place to the supporting surface.

The tread-pads B, are formed of some soft, flexible, pliable or yielding material such as soft rubber, felt, Scotch-cork or cactus fiber. Pliable rubber is preferred because of its elasticity and its softness to the feet and its non-slipping qualities. It is also preferred for its hygienic nature and its easy cleansing. In addition to the tread-pads forming a non-slipping surface, they provide a mat or shoe-wiper and thus when walked on prevent the tracking of mud, dirt, snow and dampness into a building, room, booth or vehicle. Instead of the foot of the tread-pad being of angular form it may obviously have other shapes, such as the widening taper $e'$, shown in Fig. 5. The use of rubber is thought to be preferable for the forming of the tread-pads for the further reason that when the tread-pads are constructed of this material they may be fitted tightly in the holes through the plate A to thereby prevent water from leaking through and rusting the under side of the plate A and also preventing dust and dirt from accumulating beneath the tread and also from accumulating between the feet of the tread-pads and the plate.

It will be manifest from the foregoing that a tread-pad or tread unit embodying my invention may be constructed of parts manufactured in separate establishments and readily assembled without auxiliary fastening means for shipment to the trade, the parts themselves having ample interengagement to prevent disconnection and consequent loss or confusion.

It will be apparent also that inasmuch as the tread-unit consists of a single metal sheet provided with readily insertible, upwardly extending-non-slip ribs, it need extend only an inappreciable distance above the running-board, a distance not sufficiently great to permit stumbling of persons entering the car with their attention directed elsewhere. A tread-unit embodying my invention may be readily repaired should one or more of the ribs become cut or broken through severe and unusual usage by merely removing the fastening screws from the apertures F and replacing the particular broken or damaged rib without other action, an inexpensive and readily performed operation.

In providing a single, continuous, unbroken, upwardly extending flange about each rib no sharp corners are provided to cut into and wear away the material of the rib. These flanges are preferably provided by stamping up the material of the plate. Where this flange is provided in this manner the curves at the end tend to clamp the ends of the ribs tightly when the ribs are inserted and in this manner aid materially in holding them in place during shipment and positioning upon the running-board of the automobile. The embodiment of the invention just described is well calculated to remove a large part, if not all, of the dirt from the bottom of shoes of persons stepping thereupon and this dirt in falling in the open and smooth recesses between the ribs may be easily brushed or washed away.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

What is claimed is:

1. A non-slip tread-unit comprising a carrying plate provided with apertures each surrounded by a continuous, unbroken, upwardly extending, integral flange and pliable tread-ribs removably seated in said apertures and held in place by said flanges against movement either through or out of said apertures.

2. A non-slip tread-unit comprising a carrying plate provided with elongated tread-pad ribs extending through it, said ribs being each surrounded by a continuous up-turned flange, and said ribs being spaced apart and the space between them being unobstructed and smooth and providing open passages of even width between the ribs extending completely across the rib portion of said unit.

3. A non-slip unit comprising a carrying plate provided with a plurality of elongated apertures arranged in parallelism and pliable tread-ribs removably inserted through said apertures from beneath and frictionally held in place and each having base flanges extending oppositely from its portion disposed through an aperture and engageable between said plate and the surface upon which it may be positioned.

In testimony whereof I have hereunto signed my name in the presence of two subscribing witnesses.

FRANK H. STANWOOD.

Witnesses:
RENA E. FISH,
F. L. DALTON.

Copies of this patent may be obtained for five cents each, by addressing the "Commissioner of Patents, Washington, D. C."